(12) United States Patent
Reiner et al.

(10) Patent No.: US 8,489,816 B1
(45) Date of Patent: *Jul. 16, 2013

(54) PREDICTING AND OPTIMIZING I/O PERFORMANCE CHARACTERISTICS IN A MULTI-LEVEL CACHING SYSTEM

(75) Inventors: David Reiner, Lexington, MA (US); John Cardente, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,224

(22) Filed: Jan. 12, 2012

Related U.S. Application Data

(63) Continuation of application No. 12/190,071, filed on Aug. 12, 2008, now Pat. No. 8,112,586, which is a continuation of application No. 12/139,160, filed on Jun. 13, 2008, now abandoned.

(51) Int. Cl.
*G06F 12/08* (2006.01)
(52) U.S. Cl.
USPC ..... 711/122; 711/118; 711/119; 711/E12.024
(58) Field of Classification Search
USPC .......................... 711/122, 118, 119, E12.024
See application file for complete search history.

(56) References Cited

U.S. PATENT DOCUMENTS

2010/0036805 A1* 2/2010 Blamer et al. .................... 707/3

* cited by examiner

*Primary Examiner* — Yong Choe
(74) *Attorney, Agent, or Firm* — Gerald P. Kazanjian; Krishnendu Gupta

(57) ABSTRACT

A predictive model specifies a workload to be applied to a hierarchy of caches having multiple levels of caches. The predictive model defines a configuration for the hierarchy of caches by specifying cache characteristics of each level of the hierarchy of caches and the underlying storage pool and applies the workload to the configuration. For each level of the configuration, the predictive model computes a performance metric based on a portion of the workload satisfied at the level and the cache characteristics of the level. The predictive model computes resource allocation metrics based on the performance metric for the levels and a cost associated with the configuration. Based on the workload, the configuration, performance metrics, and resource allocation metrics, the predictive model creates a design time recommendation for the hierarchy of caches, a configuration time recommendation and run time recommendation for the hierarchy of caches.

20 Claims, 10 Drawing Sheets

| Workload Choice | Active Workload |
| --- | --- |
| 170 LISTING OF WORKLOAD PARAMETERS | TPC-H |
| Read Sequential % of IOPS | 45.0% |
| Read Random % of IOPS | 15.0% |
| Write Sequential % of IOPS | 40.0% |
| Write Random % of IOPS | 0.0% |
| Total | 100% |
| Access Skew | A-Skew |
| Read Sequential | 80.0% |
| Read Random | 55.0% |
| Write Sequential | 80.0% |
| Write Random | 50.0% |
| Access Skew | B-Skew |
| Read Sequential | 20.0% |
| Read Random | 45.0% |
| Write Sequential | 20.0% |
| Write Random | 50.0% |
| Workload database scale factor | 2.00 |
| Database size (GB) | 2,000 |
| Workload IOPS scale factor | 4.10 |
| IOPS | 41,000 |
| Avg Sequential Read Count | 50 |
| Database % on storage system | 100.0% |
| Max % IOPS capacity in hierarchy | 31.0% |

160-1 VIEW

160-2 VIEW

Storage System Choice

| Component of Storage Hierarchy | Active Server Generic Server 16GB | Active Storage System Int Switch 64GB Cache | Active Storage System Symm 5 128GB Cache | Active Storage System Symm 5 8530 3168GB |
|---|---|---|---|---|
| I/O Response Time (Microseconds) | Server Memory | | | |
| Sequential Read | 1 | 60 | 300 | 4,500 |
| Random Read | 1 | 60 | 300 | 6,000 |
| Sequential Write | 1 | 90 | 400 | 6,500 |
| Random Write | 1 | 90 | 400 | 6,500 |
| IOPS scale factors | 1.00 | 1.00 | 1.00 | 1.00 |
| IOPS scaling effectiveness | 1.70 | % of max IOPS allowed | | 70.00% |
| Maximum Sequential Read IOPS | 1,000,000 | 600,000 | 150,000 | 42,700 |
| Maximum Random Read IOPS | 1,000,000 | 600,000 | 150,000 | 17,600 |
| Maximum Sequential Write IOPS | 1,000,000 | 400,000 | 50,000 | 22,700 |
| Maximum Random Write IOPS | 1,000,000 | 400,000 | 25,000 | 16,300 |
| Capacity scale factors | 1.00 | 1.00 | 1.00 | 1.00 |
| Capacity effectiveness | 0.85 | 0.85 | 0.85 | 0.85 |
| Rated capacity (GB) | 16.0 | 64.0 | 128.0 | 3,168.0 |
| Effective capacity (GB) | 13.6 | 54.4 | 108.8 | 2,692.8 |
| Proportion of database held | 0.680% | 2.720% | 5.440% | 100.000% |
| Database size (GB) | 2,000.0 | | | |
| Field Cost | $19,000 | $0 | $0 | $62,000 |
| Field Cost / Useable GB | $1,188 | $0 | $0 | $20 |
| Include Server cost in system total | No | | | |

I/O Request Analysis across Memory and Storage Hierarchy

Server

| | Initial IOPS Requested | Requests as a % of Server Capacity | Server Memory Hit % | Server Memory Hits/sec | Hits as a % of Server Capacity | Avg Service Time for Hits (usec) | Server Memory Misses/sec |
|---|---|---|---|---|---|---|---|
| Sequential Read | 18,450 | 1.8% | 94.0% | 17,343 | 1.7% | 1.0 | 1,107 |
| Random Read | 6,150 | 0.6% | 0.6% | 35 | 0.0% | 1.0 | 6,115 |
| Sequential Write | 16,400 | 1.6% | 0.0% | 0 | 0.0% | 1.0 | 16,400 |
| Random Write | 0 | 0.0% | 0.0% | 0 | 0.0% | 1.0 | 0 |
| Total or Weighted Average | 41,000 | 4.1% | 42.4% | 17,378 | 1.7% | 1.0 | 23,622 |

Application Cache

| | IOPS Requested | Requests as a % of App Cache Capacity | Theoretical Application Cache Hit % | Adjusted Application Cache Hit % | Adjusted Application Cache Hits/Sec | Hits as a % of App Cache Capacity | Avg Service Time for Hits (usec) | Application Cache Misses/sec |
|---|---|---|---|---|---|---|---|---|
| Sequential Read | 1,107 | 0.2% | 94.0% | 94.0% | 1,041 | 0.2% | 60.0 | 66 |
| Random Read | 6,115 | 1.0% | 2.4% | 1.9% | 115 | 0.0% | 60.0 | 6,000 |
| Sequential Write | 16,400 | 4.1% | 100.0% | 100.0% | 16,400 | 4.1% | 90.0 | 0 |
| Random Write | 0 | 0.0% | 0.0% | 0.0% | 0 | 0.0% | 90.0 | 0 |
| Total or Weighted Average | 23,622 | 5.3% | 74.5% | 74.3% | 17,556 | 4.3% | 88.0 | 6,066 |

Array Cache

| | IOPS Requested | Requests as a % of Array Cache Capacity | Theoretical Array Cache Hit % | Adjusted Array Cache Hit % | Adjusted Array Cache Hits/Sec | Hits as a % of Array Cache Capacity | Avg Service Time for Hits (usec) | Array Cache Misses/sec |
|---|---|---|---|---|---|---|---|---|
| Sequential Read | 66 | 0.0% | 96.0% | 96.0% | 63 | 0.0% | 300.0 | 3 |
| Random Read | 6,000 | 4.0% | 11.2% | 9.0% | 539 | 0.4% | 300.0 | 5,461 |
| Sequential Write | 0 | 0.0% | 0.0% | 0.0% | 0 | 0.0% | 400.0 | 0 |
| Random Write | 0 | 0.0% | 0.0% | 0.0% | 0 | 0.0% | 400.0 | 0 |
| Total or Weighted Average | 6,066 | 4.0% | 12.1% | 9.9% | 602 | 0.4% | 300.0 | 5,464 |

Disk

| | IOPS Requested | Requests as a % of Disk Capacity | Disk Hit % | Disk Hits/Sec | Hits as a % of Disk Capacity | Avg Service Time for Hits (usec) | Disk Misses/sec |
|---|---|---|---|---|---|---|---|
| Sequential Read | 3 | 0.0% | 100.0% | 3 | 0.0% | 4,500.0 | 0 |
| Random Read | 5,461 | 31.0% | 100.0% | 5,461 | 31.0% | 6,000.0 | 0 |
| Sequential Write | 0 | 0.0% | 0.0% | 0 | 0.0% | 6,500.0 | 0 |
| Random Write | 0 | 0.0% | 0.0% | 0 | 0.0% | 6,500.0 | 0 |
| Total or Weighted Average | 5,464 | 31.0% | 100.0% | 5,464 | 31.0% | 5,999.2 | 0 |

160-3 VIEW

PREDICTING AND OPTIMIZING I/O PERFORMANCE CHARACTERISTICS IN A MULTI-LEVEL CACHING SYSTEM

RELATED APPLICATION

This application is a Continuation of U.S. patent application Ser. No. 12/190,071 filed on Aug. 12, 2008 entitled "PREDICTING AND OPTIMIZING I/O PERFORMANCE CHARACTERISTICS IN A MULTI-LEVEL CACHING SYSTEM," which application is a Continuation of U.S. patent application Ser. No. 12/139,160 filed on Jun. 13, 2008 entitled PREDICTING AND OPTIMIZING I/O PERFORMANCE CHARACTERISTICS IN A MULTI-LEVEL CACHING SYSTEM," the content and teachings of which are hereby incorporated by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs). A storage area network is a collection of data storage systems that are networked with a number of host computer systems that operate as servers to access data stored in the data storage systems.

SANs are large, complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, caches, host devices and file systems, and the like.

By storing frequently used data in caches placed throughout the SAN, requests for the frequently used data can be satisfied without incurring time costs associated with accessing the data at slower storage mediums. Hence, the efficiency and effectiveness of the SAN can be greatly improved by choosing a configuration of caches to be included in the SAN in light of the requests the SAN handles.

SUMMARY

Current conventional systems suffer from a variety of deficiencies. Specifically, since SANs (and other organizations of servers, network attached storage, storage elements and/or caches) can be configured in a variety of ways—with different levels of caches having variable cache characteristics—it is difficult to identify combinations of cache characteristics for each cache level that will result in optimal performance of a hierarchy of caches handling requests sent to the SAN.

Moreover, since the number and types of requests sent to a SAN often vary, a particular configuration for a hierarchy of caches in the SAN may be optimal for a particular workload of requests for stored data but may prove to be inefficient under different workload conditions.

Current conventional systems fail to provide the ability to easily predict how a particular configuration for a hierarchy of caches will behave as various portions of a workload are successively consumed (i.e., satisfied) by different levels within the hierarchy of caches. Further, since a multi-level arrangement of caches can offset particular workloads at one level via characteristics at other levels, or can diminish the cost of the multi-level configuration while still providing acceptable service levels for workloads, such conventional systems fail to allow a user to easily compare the predicted behavior of different configurations for a hierarchy of caches with respect to different workloads.

Techniques discussed herein significantly overcome the deficiencies of conventional applications such as those discussed above. As will be discussed further, certain specific embodiments herein are directed to a predictive model. The predictive model allows a user to specify a workload that describes aspects related to a given set of input/output (I/O) operations (e.g. requests associated with stored data) that may be handled by a hierarchy of caches. The predictive model also allows the user to specify a configuration that describes cache characteristics at each level of caches in the hierarchy of caches.

The predictive model predicts the behavior of each level of the hierarchy of caches with respect to the request characteristics in the specified workload. By predicting the behavior of each level as the specified workload propagates through the hierarchy of caches to storage pools at a final level of the hierarchy of caches, the predictive model creates performance metrics indicating whether the configuration for the hierarchy of caches and a storage pool at a final level will result in optimal performance when presented with the specified workload. It is understood that an aspect of the workload that is defined by the predictive model includes specifying a size of a database against which requests are made.

The predictive model also creates complex metrics based on the expected behavior (i.e., performance metrics) of each level as the predictive model predicts how the selected workload propagates through levels of the hierarchy of caches—where different portions of the selected workload are satisfied at different levels of the hierarchy of caches and the storage pool at a final level. Such complex metrics include, but are not limited to resource allocation metrics that can reflect performance metrics and also a cost associated with each level of the configuration. Further, based on the expected behavior of each level and the resource allocation metrics, the predictive model creates design, configuration and run time recommendations, for example to meet desired workload service levels while overcoming inefficiencies and redundancies such as double caching, where the same data item is stored in multiple cache levels.

In general embodiments, the predictive model defines a workload to be applied to a hierarchy of caches having multiple levels of caches with a storage pool at a final level. The predictive model defines a configuration for the hierarchy of caches and the storage pool at the final level by specifying cache characteristics of each level of the hierarchy of caches and storage characteristics for the storage pool at the final level, and the workload's request characteristics are applied to a model of the configuration for the hierarchy of caches and the storage pool at the final level to predict the portions of workload requests that are satisfied at each level of the configuration. For each level of the configuration, the predictive model computes a performance metric based on a portion of the workload satisfied at the level and the cache characteristics of the level. It is understood that some portions of the workload will miss at each cache level of the hierarchy of caches and will eventually be handled by the storage pool at the final level.

In addition, the predictive model computes resource allocation metrics based on performance metrics for the levels and a cost associated with the configuration. Based on the workload, the configuration, performance metrics, and resource allocation metrics, the predictive model creates design time recommendations, configuration time recommendations and run time recommendations for the hierarchy of caches and the storage pool at the final level.

Such design time recommendations can identify a desirable number of levels for the hierarchy of caches to handle the workload, a cache size for each level in the hierarchy of caches and a data storage technology to be used in each level in the hierarchy of caches and for the storage pool at the final level. The configuration recommendations can determine dynamic cache partition sizes and allocations to application workloads and can provide an indication of whether the hierarchy of caches should be allocated on a grid or a network. The run time recommendations can provide indications for a reallocation for dynamic cache partitions, such as including the addition or removal of levels and use of alternative data storage technology that provide equivalent or better performance with lower cost as defined by the selected resource allocation metric.

In one embodiment, the predictive model can predict level behavior for a workload (or multiple workloads) with respect to multiple configurations—each configuration specifying different cache characteristics for the levels in the hierarchy of caches and storage characteristics for the storage pool at the final level. The predictive model can thereby concurrently predict the behavior of levels when the hierarchy of caches and the storage pool at the final level are configured according to different configurations. The predictive model includes a graphical user interface that concurrently displays performance metrics, resource allocation metrics and recommendations associated with the predicted behavior of each configuration. The user can thereby view such metrics and easily discern how behavior of various levels in different hierarchy configurations is different, and which configurations are preferable with respect to performance and resource allocation metrics. In addition, the predictive model can allow the user to identify where bottlenecks exist due to the cache characteristics of levels that satisfy portions of a workload and where caching decisions are effective or not.

In yet another embodiment, the predictive model can also allow a user to specify a class of data potentially associated with a request in a workload to be applied through the hierarchy of caches and the storage pool at a final level configured according to a configuration(s), and to specify for the class at least one aggregate performance goal and at least one resource allocation goal for the data. The predictive model predicts the behavior of levels in the hierarchy of caches and the storage pool at the final level for the workload with respect to the at least one aggregate performance goal and at least one resource allocation goal for the specified class to identify a desirable level within the hierarchy of caches and the storage pool at a final level to initially store or cache the data in this class in a configuration where cache contents are mutually exclusive across the hierarchy of caches and the storage pools at the final level.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by EMC, Inc., of Hopkinton, Mass.

Note that each of the different features, techniques, configurations, etc. discussed in this disclosure may be executed independently or in combination. Accordingly, the present invention may be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The above and further advantages of the present invention may be better under stood by referring to the following description taken into conjunction with the accompanying drawings in which:

FIG. 6 is an example view of a specified workload in the predictive model implemented via a spreadsheet application according to embodiments herein.

FIG. 8 is an example view of a defined configuration in a predictive model implemented via a spreadsheet application according to embodiments herein.

FIG. 9 is an example view of performance metrics computed by a predictive model implemented via a spreadsheet application according to embodiments herein.

DETAILED DESCRIPTION

Figure 1:
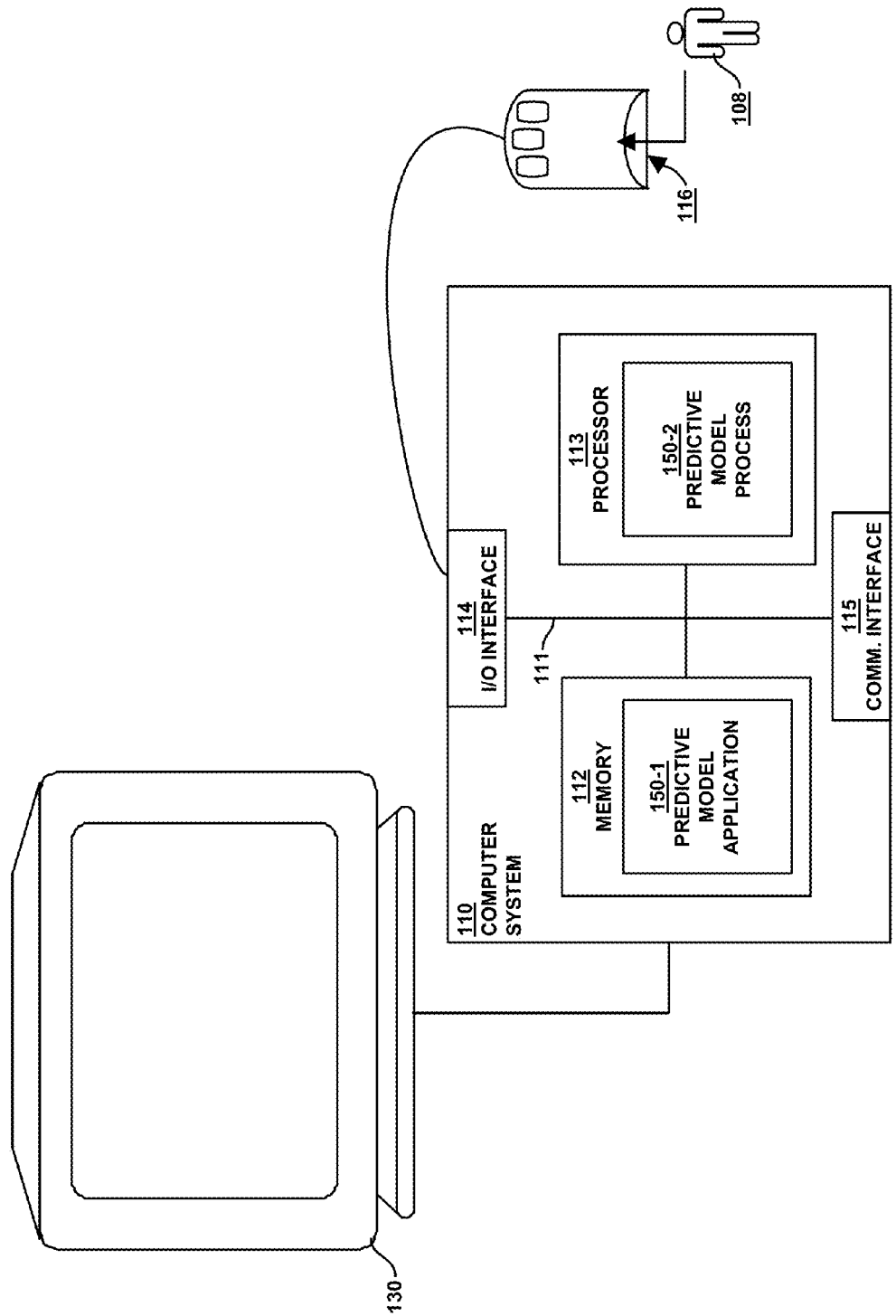
FIG. 1 is an example block diagram illustrating an architecture of a computer system that executes a predictive model application and/or a predictive model process according to embodiments herein.

Embodiments of a predictive model, as disclosed and described herein, define a workload to be applied to a hierarchy of caches having multiple levels of caches and a storage pool at the final level. The predictive model defines a configuration for the hierarchy of caches by specifying cache characteristics of each level of the hierarchy of caches and the storage characteristics of the storage pool at the final level and applies the workload to the configuration. For each level of the configuration, the predictive model computes a performance metric based on a portion of the workload satisfied at the level and the cache characteristics or storage characteristics of the level.

The predictive model computes resource allocation metrics based on the performance metric for the levels and a cost associated with the configuration. Based on the workload, the configuration, performance metrics, and resource allocation metrics, the predictive model creates a design time recommendation for the hierarchy of caches and the storage pool at the final level, a configuration time recommendation for the hierarchy of caches and the storage pool at the final level, and a run time recommendation for the hierarchy of caches and the storage pool at the final level. It is understood that embodiments of predictive model, as discussed herein, are not limited to storage environment implementations regarding a Storage Area Network.

In one embodiment, the predictive model can be implemented via a spreadsheet application. Since the spreadsheet implements the predictive model, various selectable workloads and selectable configurations can be described in a list of parameters. The predictive model can predict input/output (I/O) performance characteristics associated with a workload of requests propagating through a hierarchy of caches and a storage pool at the final level configured according to a configuration. It is understood that a cache at a particular level in the hierarchy of caches can be (but is not limited to) a storage array cache, a server cache, an application cache, or a network cache. It is further understood that a storage pool is included as the final level in the hierarchy of caches.

The predictive model instantly calculates I/O request analyses across the multiple levels of the hierarchy of caches and the storage pool at the final level, such as overall service times. For each level in a configuration for the hierarchy of caches and the storage pool at the final level, the predictive model calculates the percentages of I/O requests satisfied, the cumulative percentage of requests satisfied, and the maximum percentage of I/O operations per second (IOPS) capacity used.

In yet another embodiment, the predictive model can be embedded in a self-managed storage system. An embedded predictive model can process data related to workloads experienced by the self-managed storage system and characteristics of caches and at least one storage pool in the self-managed system. As the embedded predictive model processes such data, the predictive model can compute performance metrics that can trigger: automated cache partitioning, allocation of cache resources in a grid or network, allocation of hierarchical cache resources to storage volumes, and a block virtualization policy engine to determine equivalent tiers of storage based on access patterns and fitness metrics (e.g. media cost, power consumption, etc.).

Turning now to FIG. 1, FIG. 1 is an example block diagram illustrating an architecture of a computer system 110 that executes, runs, interprets, operates or otherwise performs a predictive model application 150-1 and/or predictive model process 150-2 (e.g. an executing version of a predictive model 150 as controlled or configured by user 108) according to embodiments herein. Note that the computer system 110 may be any type of computerized device such as a personal computer, a client computer system, workstation, portable computing device, console, laptop, network terminal, computing elements within a storage system, etc. This list is not exhaustive and is provided as an example of different possible embodiments. In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the predictive model 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the predictive model application 150-1 and/or the predictive model process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the predictive model application 150-1. Execution of the predictive model application 150-1 in this manner produces the predictive model process 150-2. In other words, the predictive model process 150-2 represents one or more portions or runtime instances of the predictive model application 150-1 (or the entire application 150-1) performing or executing within or upon the processor 113 in the computerized device 110 at runtime.

The predictive model application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the predictive model application 150-1 can be executed on a remotely accessible computerized device via the communication interface 115.

Figure 2:
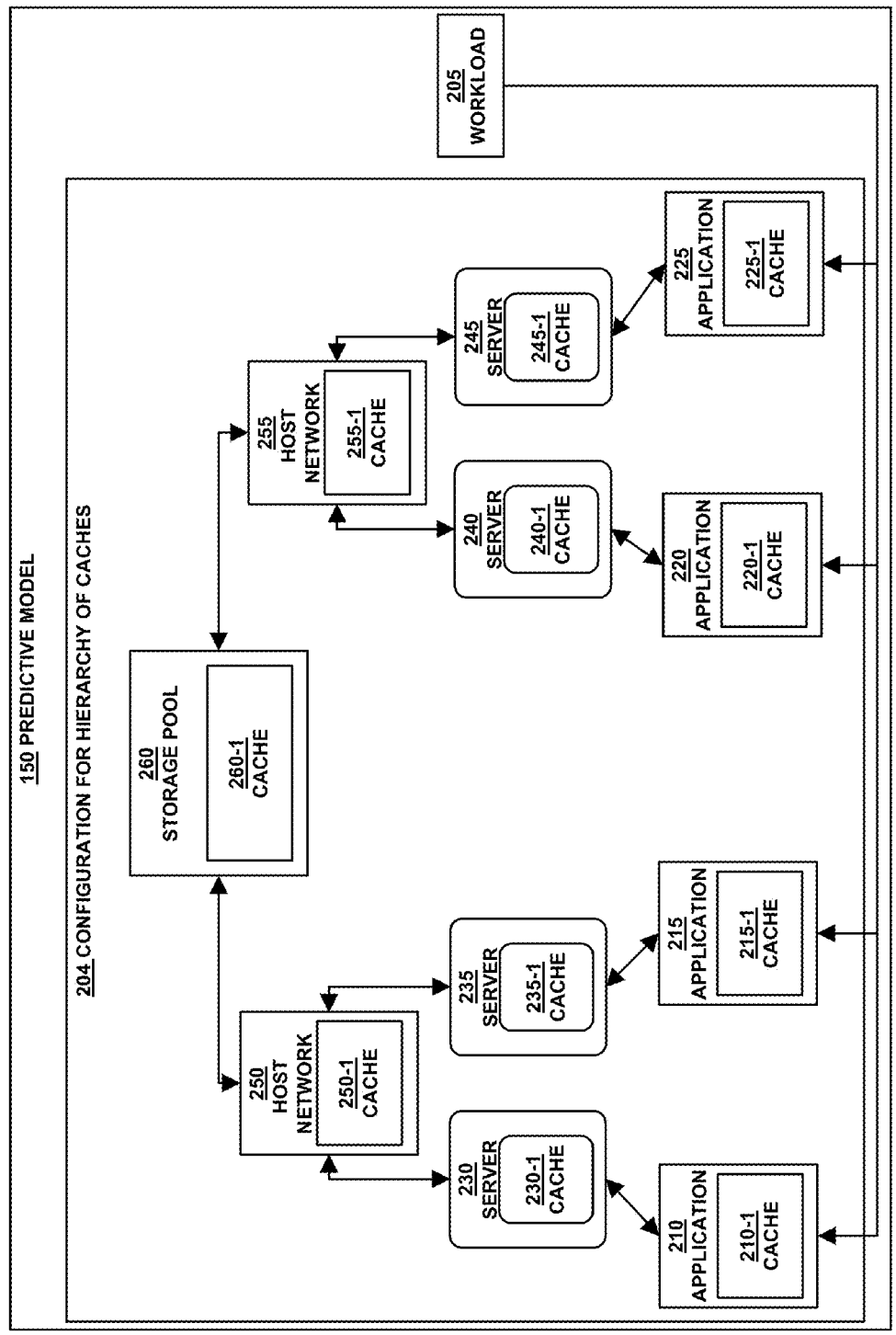
FIG. 2 is an example block diagram of a predictive model 150 predicting behavior of a configuration for a hierarchy of caches and a storage pool at a final level with respect to a workload according to embodiments herein.

FIG. 2 is an example block diagram of a predictive model 150 predicting behavior of a configuration for a hierarchy of caches with respect to a workload according to embodiments herein. The predictive model 150 defines a configuration for with a hierarchy of caches 204 in front of a storage pool 260 at a final level of the hierarchy of caches 204, where the storage pool 260 can be a storage array(s), etc. The configuration for the hierarchy of caches 204 includes four levels: an application level, a server level, a host network level and the storage pool 260. It is understood that the configuration for the hierarchy of caches 204 is not limited to four levels.

As illustrated, the application level includes applications 210, 215, 220, 225, each with their own respective caches 210-1, 215-1, 220-1, 225-1. At a deeper level after the application level, the server level includes servers 230, 235, 240, 245, each with their own respective caches 230-1, 235-1, 240-1, 245-1. At a next deeper level, the host network level includes host networks 250, 255, each with their own respective caches 250-1, 255-1. The storage pool 260 includes its own cache 260-1 as well. It should be noted that in a typical arrangement, many more entities, such as applications 210, 215, 220, 225 may coexist, thus relying on a single server 230-1 cache from multiple applications 210, for example, each also having a dedicated application cache 210-1.

The predictive model 150 specifies parameters in the configuration for the hierarchy of caches 204 to describe cache characteristics for each cache 210-1, 215-1, 220-1, 225-1, 230-1, 235-1, 240-1, 245-1, 250-1, 255-1, 260-1 at each level. The predictive model 150 also specifies parameters in the configuration for the storage pool 260. The predictive model 150 also defines a workload 205, which includes a set of Input/Output (I/O) operations. Based on parameters that describe the workload 205 and cache characteristics, the predictive model 150 predicts a propagation of the workload 205 from the application level to the storage pool 260 (e.g. individual disk drives in the storage array or other non-volatile storage medium).

As the predictive model 150 predicts the propagation of the workload 205 across various levels, certain portions of the workload 205 will be satisfied at different levels in the hierarchy of caches. In other words, for each request, the cache at that level result in either a cache hit, returning the requested data item, or a cache miss, in which case the cache at the next level is searched. For example, the predictive model 150 can predict that a portion of the workload will not be satisfied until it reaches the storage array level. Hence, that portion of the workload 205 passes through, unsatisfied, the caches 210-1, 230-1, and 250-1 at the application level, server level and host network level respectively, until the cache 260-1 or the storage pool 260 satisfies that portion of the workload.

The predictive model 150 creates performance metrics that describe the predicted behavior of the cache 260-1 and the storage pool 260—based on satisfying a given portion of the workload. The performance metrics can be used to create resource allocation metrics which take into consideration a cost of the cache 260-1 at the storage pool 260 and the work the cache 260-1 at the storage pool 260 performs to satisfy a portion of the workload. It is understood that that predictive model 150 creates performance metrics and resource allocations for each level based a portion of the workload that is predicted to be satisfied at that level.

FIGS. 3, 4, 5 and 7 illustrate various embodiments of the predictive model 150. The rectangular elements in flowcharts 300, 400, 500 and 700 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 300, 400, 500 and 700 do not necessarily depict the syntax of any particular programming language. Rather, flowcharts 300, 400, 500 and 700 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 3:
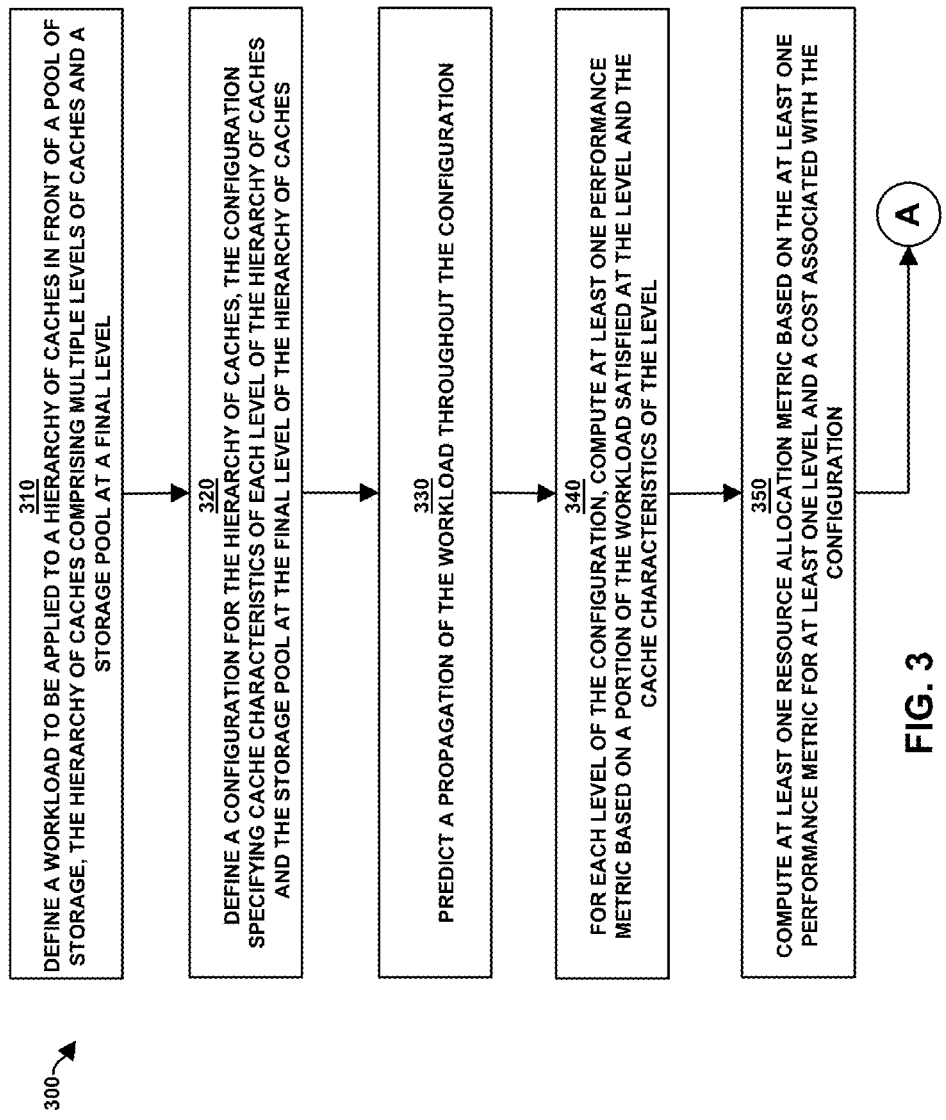
FIG. 3 is a flowchart of an example of processing steps performed by the predictive model to predict a propagation of a workload throughout a configuration for a hierarchy of caches and a storage pool at the final level, and to provide a view of performance metrics and resource allocation metrics with respect to predicting a propagation of a workload throughout a configuration for a hierarchy of caches and a storage pool at the final level according to embodiments herein

FIG. 3 is a flowchart 300 of an example of processing steps performed by the predictive model to predict a propagation of a workload throughout a configuration for a hierarchy of caches, and to provide a view of performance metrics and resource allocation metrics with respect to predicting a propagation of a workload throughout a configuration for a hierarchy of caches according to embodiments herein.

At step 310, the predictive model 150 defines a workload to be applied to a hierarchy of caches, which includes a storage pool at a final level of the hierarchy of caches. (e.g., data repository(ies), database(s), memory pool(s), storage arrays (s), etc.). The hierarchy of caches includes multiple levels of caches. It is understood that the predictive model 150 can define various workloads comprising different combinations of sequential and random reads and writes. In addition, such workloads can be skewed, thereby possessing non-uniform access distributions to data in the hierarchy of caches and the storage pool at the final level.

At step 320, the predictive model 150 defines a configuration for the hierarchy of caches that specifies cache characteristics of each level of the hierarchy of caches—and storage characteristics of the storage pool at the final level.

At step 330, the predictive model 150 predicts a propagation of the workload throughout the configuration. In other words, the predictive model 150 applies the workload to propagate from an initial level to a last level in the hierarchy of caches. In other words, as the workload passes through levels of the hierarchy of cache—where each level has cache characteristics defined by the configuration, portions of the workload can be satisfied by various levels rather than having requests access the slower memory pool. For example, the predictive model 150 satisfies a first portion of the workload at a first level of the hierarchy of caches. However, a second portion can pass through the first level to eventually be satisfied at a deeper level of the hierarchy of caches. It is understood that some portions of the workload may not be satisfied at any levels of the hierarchy of caches and may be required to access the memory pool.

At step 340, for each level of the configuration, the predictive model 150 computes performance metrics based on a portion of the workload satisfied at the level and the cache characteristics of the level.

At step 350, the predictive model 150 computes resource allocation metrics based on the at least one performance metric for at least one level and a cost associated with the configuration. Thus, in one embodiment, a resource allocation metric can reflect a relationship between a cost of a level of the hierarchy and a portion of the workload satisfied at that level.

Figure 4:
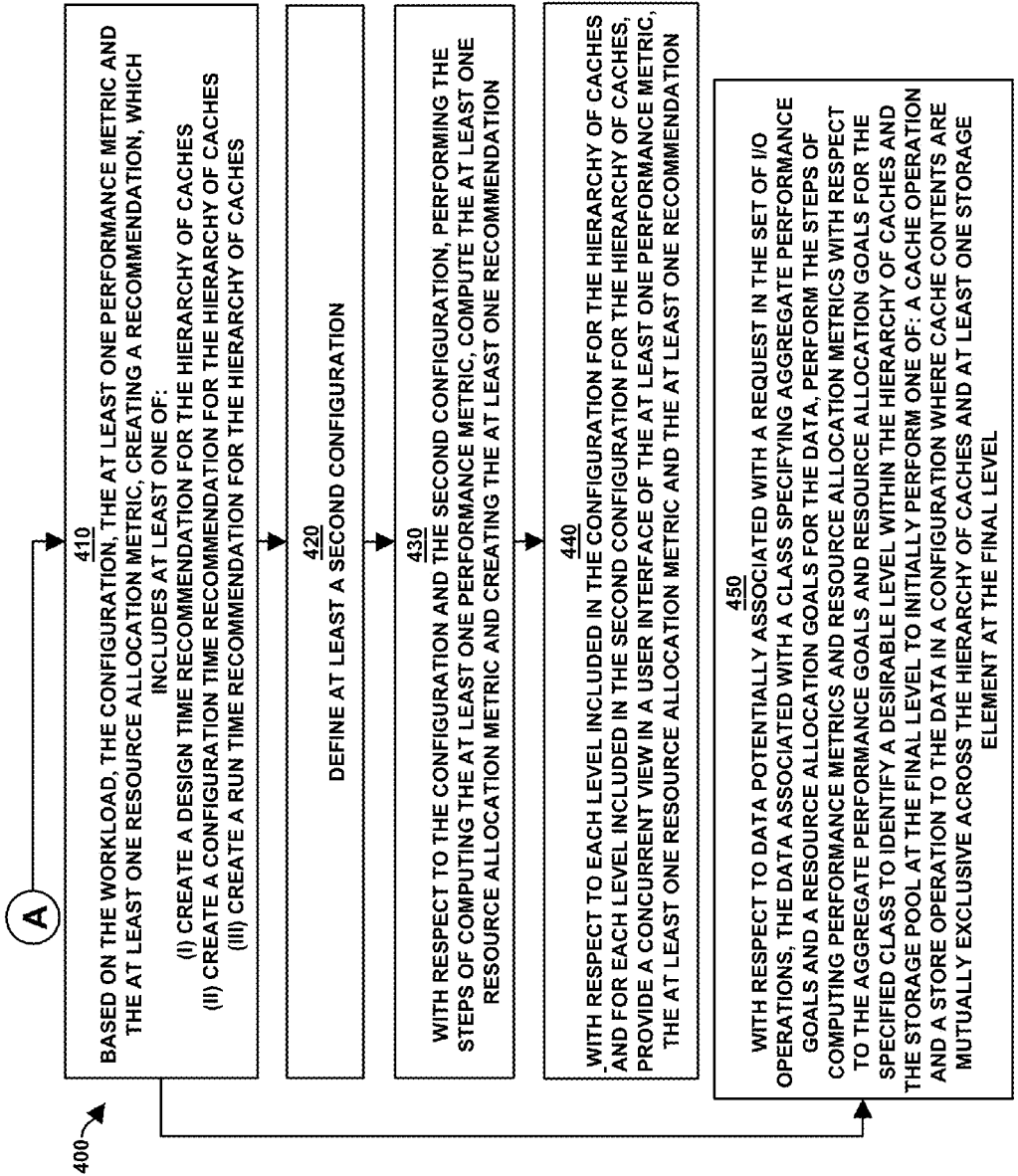
FIG. 4 is a flowchart of an example of processing steps performed by the predictive model to provide a concurrent view of performance metrics, resource allocation metrics, and recommendations with respect to predicting a propagation of a workload throughout multiple configurations for a hierarchy of caches and a storage pool at the final level according to embodiments herein.

FIG. 4 is a flowchart 400 of an example of processing steps performed by the predictive model 150 to provide a concurrent view of performance metrics, resource allocation metrics, and recommendations with respect to predicting a propagation of a workload throughout multiple configurations for a hierarchy of caches according to embodiments herein.

At step 410, based on the workload, the configuration, the performance metrics and resource allocation metrics, the predictive model 150 creates recommendations, such as: design time recommendations, configuration time recommendations, and run time recommendations for the hierarchy of caches. At step 420, the predictive model 150 defines other configurations.

At step 430, with respect to all the configurations, the predictive model 150 computes performance metrics, resource allocation metrics and creates recommendations.

At step 440, with respect to each level included in each of the configurations for the hierarchy of caches, the predictive model 150 provides a concurrent view of the performance metrics, the resource allocation metrics and recommendations in a user interface.

At step 450, instead of predicting behavior of levels in the hierarchy of caches for a given workload, the predictive model 150 can identify a desirable level for storing a class of data potentially associated with a request in the set of I/O operations. In other words, where cache contents are mutually exclusive across the hierarchy of caches and a storage pool(s) at the final level, the predictive model computes performance metrics and resource allocation metrics to identify a desirable level within the hierarchy of caches and a storage pool(s) at the final level to initially cache data in a class—the class of data potentially associated with a request in the set of I/O operations.

Figure 5:
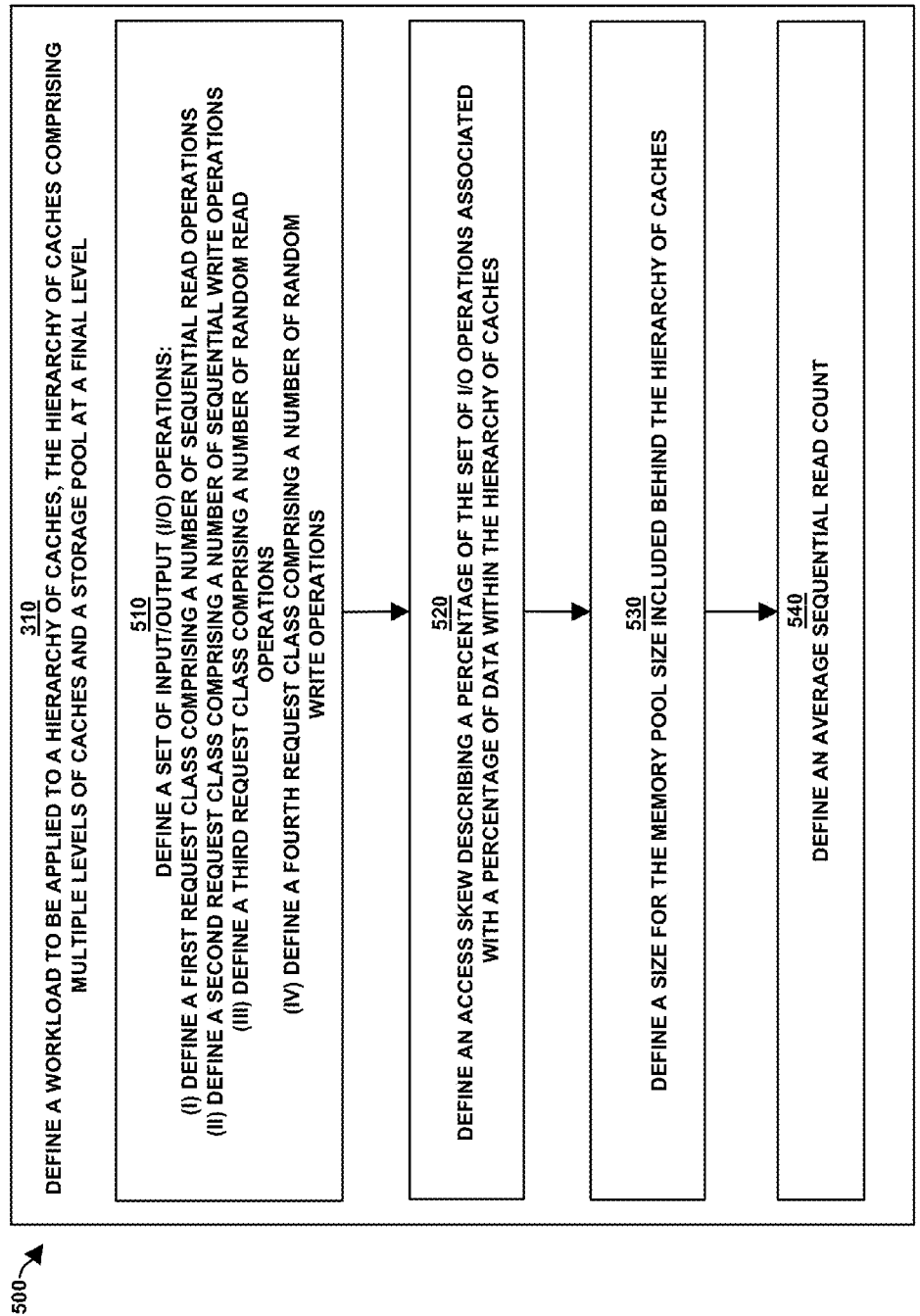
FIG. 5 is a flowchart of an example of processing steps performed by the predictive model to define a workload to be applied to a hierarchy of caches and a storage pool at the final level according to embodiments herein.

FIG. 5 is a flowchart 500 of an example of processing steps performed by the predictive model to define a workload to be applied to a hierarchy of caches according to embodiments herein. In one embodiment, the workload can be defined according to parameters listed in a spreadsheet application.

At step 510, the predictive model defines a set of input/output (I/O) operations, including a first request class comprising a number of sequential read operations, a second request class comprising a number of sequential write operations, a third request class comprising a number of random read operations and a fourth request class comprising a number of random write operations.

At step 520, the predictive model 150 defines an access skew describing a percentage of the set of I/O operations associated with a percentage of data within the hierarchy of caches. It is understood that an access skew represents that a larger percentage of the requests in the set of I/O operations access a smaller percentage of the available data—thereby creating a non-uniform data access distribution since other data will not be repeatedly accessed by requests in the set of I/O operations. Further, at steps 530 and 540, the predictive model 150 defines a size of the memory pool size included behind the hierarchy of caches and defines an average sequential read count (such as an average sequential read count for cacheable units of data), respectively. It is understood that the workload is not limited to being described by the parameters of steps 510-540.

FIG. 6 is an example view of a defined workload in the predictive model 150 implemented via a spreadsheet application according to embodiments herein. The predictive model 150 provides for the view 160-1 via a graphical user interface 160 (G.U.I.) of the spreadsheet application.

As illustrated in FIG. 6, the listing of workload parameters for a workload labeled "TPC-H" consists of a set of I/O operations where 45% of the I/O operations are sequential reads, 15% are random reads, 40% are sequential writes, and 0% random writes. "A-skew" parameters relate to percentages of the total number of sequential and random I/O operations that will interact with a subset of the data, the "B-skew" parameters relate to the percentage of records that store that data. As an example of skewed access for a particular class of operations, 80% of the accesses may be to 20% of the data; then A-skew is 80% and B-skew is 20%.

Figure 7:
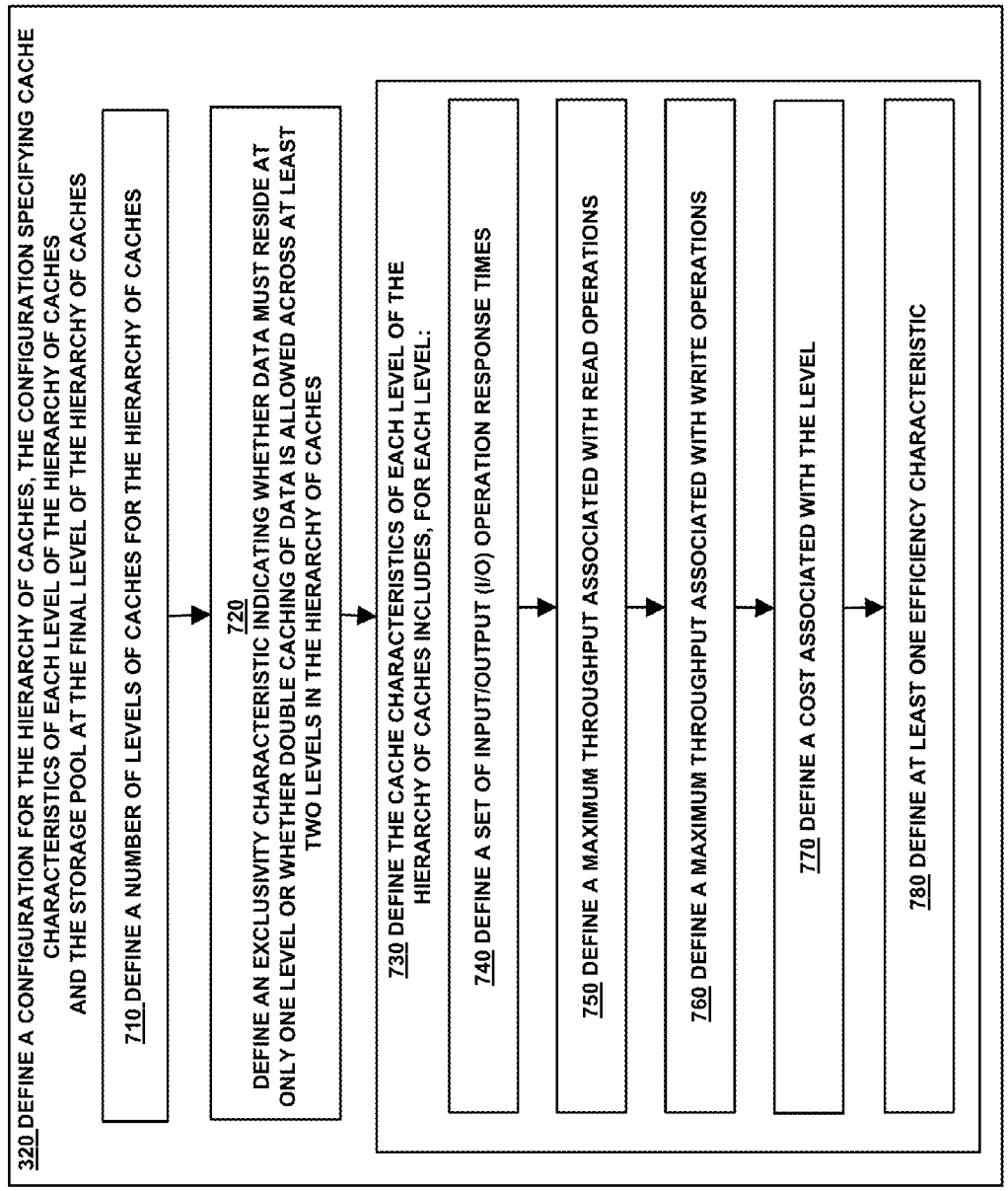
FIG. 7 is a flowchart of an example of processing steps performed by a predictive model to specify a configuration according to embodiments herein.

FIG. 7 is a flowchart of an example of processing steps performed by a predictive model 150 to define a configuration according to embodiments herein.

At step 710, the predictive model 150 defines a number of levels of caches for the hierarchy of caches. At step 720, the predictive model 150 defines an exclusivity characteristic indicating whether data must reside at only one level or whether double caching of data is expected to occur across at least two levels in the hierarchy of caches.

It is understood that the term double caching can refer to the fact that an effective size of an intermediate cache in the hierarchy of caches is reduced since some of its pages (e.g. the most-referenced ones) are likely to be cached at a next shallower level towards the application. In various embodiments, the caches in the hierarchy can operate independently, thus double caching happens naturally, and each particular request attempts to hit at each succeeding deeper level before accessing the pool of storage 270 behind the hierarchy of caches, which can be thought of as a cache level with all data items, thus having a 100% hit rate. One doesn't have to explicitly "allow" for double caching or enable it.

At step 730, the predictive model 150 defines the cache characteristics of each level of the hierarchy of caches and the storage pool. At step 740, the predictive model 150 defines a set of input/output (I/O) operation response times for each level. At step 750, the predictive model 150 defines a maximum throughput associated with read operations for each level. At step 760, the predictive model 150 defines a maximum throughput associated with write operations for each level. At step 770, the predictive model 150 defines a cost associated with each level. At step 780, the predictive model 150 defines at least one efficiency characteristic FIG. 8 is an example view of a defined configuration in a predictive model 150 implemented via a spreadsheet application according to embodiments herein. The predictive model 150 provides for a view 160-2 of the defined configuration via a graphical user interface 160 (G.U.I.) of the spreadsheet application. The configuration defined via the spreadsheet application covers a configuration for a hierarchy having four levels: a server level, network level, array level and a storage pool level. As an example, for each level, the predictive model 150 provides parameters that describe cache or storage characteristics, such as: I/O response time for read and write operations, and a cost associated with each cache level. It is understood that the view 160-1 illustrated in FIG. 6 can be concurrently displayed with the view 160-2 displaying the configuration parameters.

FIG. 9 is an example view of performance metrics computed by a predictive model 150 implemented via a spreadsheet application according to embodiments herein. The predictive model 150 provides for a view 160-3 of the performance metrics via a graphical user interface 160 (G.U.I.) of the spreadsheet application. As illustrated, the predictive model 150 lists performance metrics for each cache level in a configuration for the hierarchy of caches. In addition, via the view 160-3, the predictive model 150 also provides performance metrics for the storage pool at the final level of the hierarchy of caches. It is understood that the views 160-1, 160-2 illustrated in FIGS. 6 and 8 can be concurrently displayed with the view 160-3 displaying the performance metrics.

Figure 10:
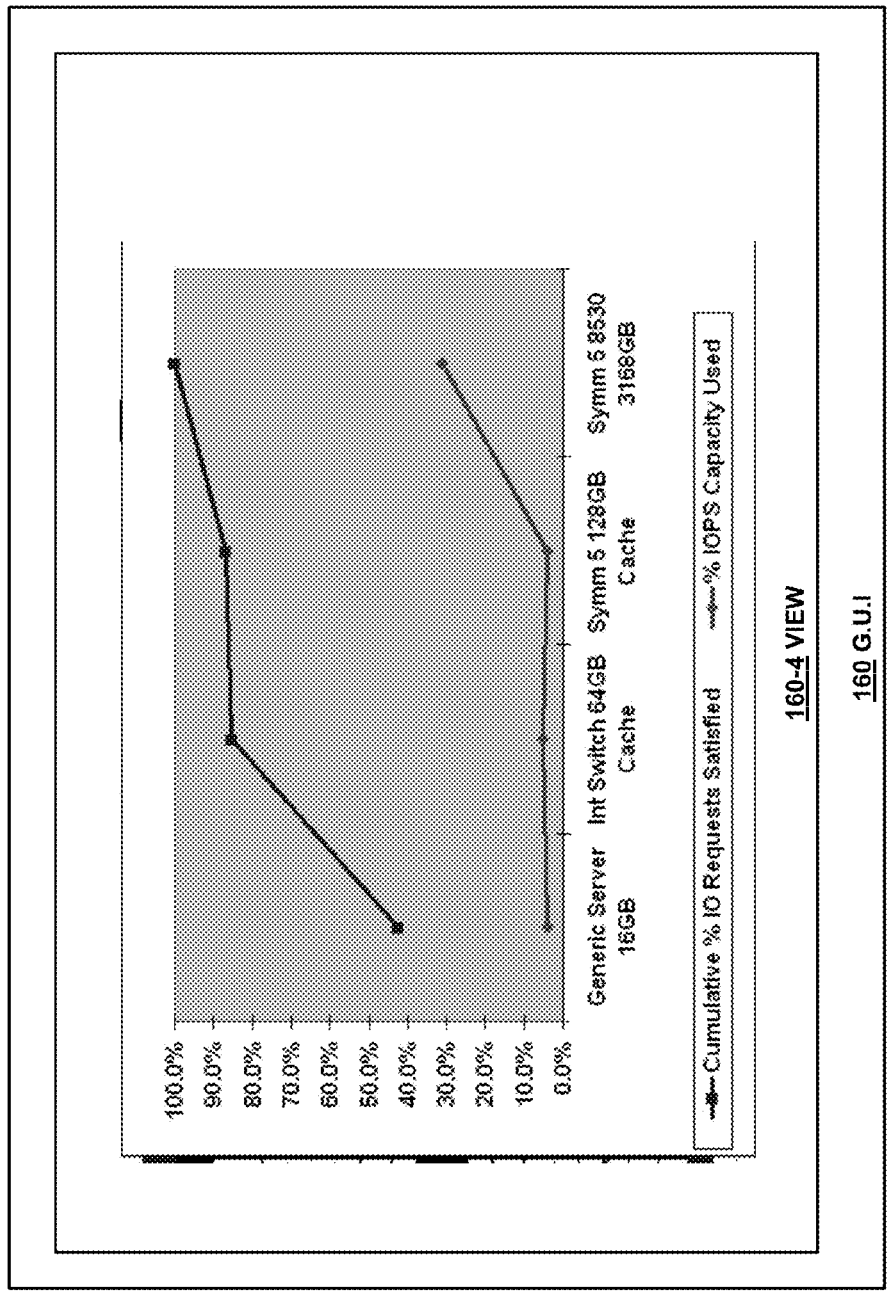
FIG. 10 is an example view of a graph computed by a predictive model based, in part, on performance metrics for each level in a configuration for a hierarchy of caches and storage pools at a final level according to embodiments herein.

FIG. 10 is an example view of a graph computed by a predictive model 150 based, in part, on performance metrics for each level in a configuration for a hierarchy of caches according to embodiments herein. The predictive model 150 provides for a view 160-4 of the graph via a graphical user interface 160 (G.U.I.) of the spreadsheet application. It is understood that the views 160-1, 160-2, 160-3 illustrated in FIGS. 6, 8 and 9 can be concurrently displayed with the view 160-4 displaying the graph.

Again, it is noted that various embodiments described herein can be a spreadsheet-based predictive model for I/O performance characteristics in a multi-level caching system experiencing variable, skewed workloads comprising sequential and random reads and writes. As an example, a multi-level caching system can be a hierarchy of caches including some combination of a storage array cache, network cache, application cache, server cache and a database management system cache. The predictive model allows for various workloads and database sizes to be represented via parameters (including I/O request profiles and skews) and allows for various configurations to be represented via parameters as well (including performance and cost). The predictive model 150 can be implemented for predicting behavior of workloads on configurations of any type of storage environment, including but not limited to hierarchies of storage pools.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   defining a workload to be applied to a hierarchy of caches;

defining a configuration for the hierarchy of caches;
predicting a propagation of the workload throughout the configuration; and
computing metrics for the configuration according to the predicted propagation.

2. The method as in claim 1, wherein the hierarchy of caches comprises multiple levels of caches in front of a storage pool, the storage pool at a final level of the hierarchy of caches and wherein predicting a propagation of the workload throughout configuration includes:
applying the workload to propagate from an initial level to the storage pool at the final level, which includes:
satisfying a first portion of the workload at a first level of the hierarchy of caches; and
satisfying a second portion of the workload at a second level of the hierarchy, the second level deeper in the hierarchy of caches than the first level, the second portion unsatisfied by the first level.

3. The method as in claim 2, wherein defining the workload to be applied to the hierarchy of caches includes:
defining a set of input/output (I/O) operations, the set of input/output (I/O) operations comprising at least one request class;
defining an access skew describing a percentage of the set of I/O operations associated with a percentage of data within the hierarchy of caches; and
defining a size of a database on the storage pool at the final level of the hierarchy of caches.

4. The method as in claim 3, wherein defining the set of input/output (I/O) operation response times includes at least one of:
(i) defining a first request class comprising a number of sequential read operations;
(ii) defining a second request class comprising a number of sequential write operations;
(iii) defining a third request class comprising a number of random read operations;
(iv) defining a fourth request class comprising a number of random write operations; and
wherein defining the workload to be applied to the hierarchy of caches further includes defining an average sequential read count.

5. The method as in claim 2, wherein the configuration specifies cache characteristics of each level of the hierarchy of caches and storage characteristics of the storage pool at the final level and wherein defining the configuration for the hierarchy of caches includes:
defining a number of levels of caches for the hierarchy of caches;
defining an exclusivity characteristic indicating one of: whether data must reside at only one level and whether double caching of data is expected across at least two levels in the hierarchy of caches;
wherein defining the cache characteristics of each level of the hierarchy of caches includes, for each level:
defining a set of input/output (I/O) operation response times; defining a maximum throughput associated with read operations; defining a maximum throughput associated with write operations; defining a cost associated with the level; and
defining at least one efficiency characteristic.

6. The method as in claim 5, wherein, computing metrics for the configuration according to the predicted propagation comprises:
for each level of the configuration, computing the at least one performance metric based on a portion of the workload satisfied at the level and the cache characteristics of the level comprising:
for each request class in a set of input/output (I/O) operations of the workload:
calculating an I/O response time associated with the portion of the workload satisfied at a given level;
calculating an I/O throughput associated with the portion of the workload satisfied at the given level; and
calculating an average service time for satisfied requests associated with the portion of the workload satisfied at the given level; and
computing at least one resource allocation metric based on the at least one performance metric for at least one level and a cost associated with the configuration.

7. The method as in claim 6, comprising:
calculating a request hit rate associated with the portion of the workload satisfied at the given level;
calculating a request miss rate associated with a portion of the workload propagating to a deeper level, the portion of the workload propagating to the deeper level including the portion of the workload not satisfied at the given level;
calculating a number of requests from the set of input/output (I/O) operations that propagate to the given level; and
calculating a number of requests in the portion of the workload satisfied at the given level.

8. The method as in claim 6, wherein computing the at least one resource allocation metric based on the at least one performance metric at least one level and a cost associated with the configuration includes:
for each level:
(i) processing the I/O response times of a level with respect to a cost of the level to compute a response time per cost metric for the level; and
(ii) processing the I/O throughput of a level with respect to the cost of the level to compute a throughput per cost metric for the level;
aggregating the response time per cost metric of each level to compute a total response time per cost metric for the configuration; and
aggregating the throughput per cost metric of each level to compute a total throughput per cost metric for the configuration.

9. The method as in claim 1, comprising:
based on the workload, the configuration, the at least one performance metric and the at least one resource allocation metric, creating a recommendation, which includes at least one of:
(i) creating a design time recommendation for the hierarchy of caches;
(ii) creating a configuration time recommendation for the hierarchy of caches; and
(iii) creating a run time recommendation for the hierarchy of caches.

10. The method as in claim 9, wherein creating the design time recommendation for the hierarchy of caches includes at least one of:
identifying a desirable number of levels for the hierarchy of caches;
identifying a cache size for each level in the hierarchy of caches; and identifying a type of data storage technology to be used in each level in the hierarchy of caches and the storage pool at the final level.

11. The method as in claim 9, wherein creating the configuration time recommendation for the hierarchy of caches includes at least one of:
   determining at least one dynamic cache partition size; and
   providing an indication of whether the hierarchy of caches should be allocated on a grid or a network.

12. The method as in claim 9, wherein creating the run-time recommendation for the hierarchy of caches includes at least one:
   providing an indication of a reallocation for at least one dynamic cache partitions; and
   providing an indication of alternative hierarchy of cache configurations providing at least one of equivalent performance service levels and improved cost.

13. The method as in claim 9, comprising:
   defining at least a second configuration; and
   with respect to the configuration and the second configuration, performing the steps of computing the at least one performance metric, computing the at least one resource allocation metric and creating the at least one recommendation.

14. The method as claim 13, comprising:
   with respect to each level included in the configuration for the hierarchy of caches and for each level included in the second configuration for the hierarchy of caches, providing a concurrent view in a user interface of the at least one performance metric, the at least one resource allocation metric and the at least one recommendation.

15. The method as in claim 9, comprising:
   with respect to data potentially associated with a request in the set of I/O operations, the data associated with a class specifying at least one aggregate performance goal and at least one resource allocation goal for the data; and
   performing the steps of computing the at least one performance metric and the at least one resource allocation metric with respect to the at least one aggregate performance goal and at least one resource allocation goal for the specified class to identify a desirable level within the hierarchy of caches and the storage pool at the final level to initially perform one of: a cache operation and a store operation to the data in a configuration where cache contents are mutually exclusive across the hierarchy of caches and at least one storage pool at the final level.

16. A non-transitory computer readable medium comprising executable instructions encoded thereon operable on a computerized device to perform processing comprising:
   instructions for defining a workload to be applied to a hierarchy of caches;
   instructions for defining a configuration for the hierarchy of caches;
   instructions for predicting a propagation of the workload throughout the configuration; and
   instructions for computing metrics for the configuration according to the predicted propagation.

17. The computer readable medium as in claim 16, wherein the hierarchy of caches comprises multiple levels of caches in front of a storage pool, the storage pool at a final level of the hierarchy of caches, wherein the configuration specifies caches characteristics of each level of the hierarchy of caches and storage characteristics of the storage pool at the final level, and wherein instructions for computing metrics for the configuration according to the predicted propagation comprises, for each level of the configuration, instructions for computing the at least one performance metric based on a portion of the workload satisfied at the level and the cache characteristics of the level comprising:
   for each request class in a set of input/output (1/0) operations of the workload:
      instructions for calculating an 1/0 response time associated with the portion of the workload satisfied at a given level;
      instructions for calculating an 1/0 throughput associated with the portion of the workload satisfied at the given level;
      instructions for calculating an average service time for satisfied requests associated with the portion of the workload satisfied at the given level;
      instructions for calculating a request hit rate associated with the portion of the workload satisfied at the given level;
      instructions for calculating a request miss rate associated with a portion of the workload propagating to given level, the portion of the workload propagating to given level including the portion of the workload satisfied at the given level;
      instructions for calculating a number of requests from the set of input/output (1/0) operations that propagate to the given level; and
      instructions for calculating a number of requests in the portion of the workload satisfied at the given level; and
   instructions for computing at least one resource allocation metric based on the at least one performance metric for at least one level and a cost associated with the configuration.

18. The computer readable medium as in claim 17, wherein the instructions for computing the at least one resource allocation metric based on the at least one performance metric at least one level and a cost associated with the configuration include:
   for each level:
      (i) instructions for processing the I/O response times of a level with respect to a cost of the level to compute a response time per cost metric for the level; and
      (ii) instructions for processing the I/O throughput of a level with respect to the cost of the level to compute a throughput per cost metric for the level;
   instructions for aggregating the response time per cost metric of each level to compute a total response time per cost metric for the configuration; and
   instructions for aggregating the throughput per cost metric of each level to compute a total throughput per cost metric for the configuration.

19. The computer readable medium as in claim 16, comprising:
   instructions for creating a recommendation based on the workload, the configuration, the at least one performance metric and the at least one resource allocation metric, which include:
      (i) instructions for creating a design time recommendation for the hierarchy of caches;
      (ii) instructions for creating a configuration time recommendation for the hierarchy of caches; and
      (iii) instructions for creating a run time recommendation for the hierarchy of caches.

20. A computer system comprising:
   a processor;
   a memory unit configured to store instructions associated with an application executed by the processor; and
   an interconnect coupling the processor and the memory unit, enabling the computer system to execute the application and perform operations of:
   defining a workload to be applied to a hierarchy of caches;

defining a configuration for the hierarchy of caches;
predicting a propagation of the workload throughout the configuration; and
computing metrics for the configuration according to the predicted propagation.

\* \* \* \* \*